(12) United States Patent  (10) Patent No.: US 12,262,449 B2
Coudert et al.  (45) Date of Patent: Mar. 25, 2025

(54) DATA ATTESTATION IN A WIRELESS COMMUNICATION SYSTEM

(71) Applicant: T-MOBILE INNOVATIONS LLC, Overland Park, KS (US)

(72) Inventors: Oliver Coudert, Arlington, VA (US); Lyle Walter Paczkowski, Mission Hills, KS (US); Bharatwajan Raman, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 365 days.

(21) Appl. No.: 17/840,868

(22) Filed: Jun. 15, 2022

(65) Prior Publication Data

US 2023/0413031 A1  Dec. 21, 2023

(51) Int. Cl.
*H04W 8/18* (2009.01)
*G01S 19/23* (2010.01)
*H04W 4/029* (2018.01)
*H04W 4/50* (2018.01)
*H04W 24/04* (2009.01)

(52) U.S. Cl.
CPC .............. *H04W 8/18* (2013.01); *G01S 19/23* (2013.01); *H04W 4/029* (2018.02); *H04W 4/50* (2018.02); *H04W 24/04* (2013.01)

(58) Field of Classification Search
CPC ......... H04W 8/18; H04W 4/029; H04W 4/50; H04W 24/04; H04W 12/104; G01S 19/23; G01S 5/0036; G01S 19/215
See application file for complete search history.

(56) References Cited

U.S. PATENT DOCUMENTS

| 10,251,053 | B1 | 4/2019 | Paczkowski et al. |
| 10,594,034 | B1 | 3/2020 | Tran et al. |
| 10,924,466 | B2 | 2/2021 | Biyani et al. |
| 11,032,293 | B2 | 6/2021 | Biyani et al. |
| 2019/0012637 | A1 | 1/2019 | Gillen |
| 2019/0019144 | A1 | 1/2019 | Gillen |
| 2019/0102850 | A1 | 4/2019 | Wheeler et al. |

(Continued)

FOREIGN PATENT DOCUMENTS

| CN | 101483522 B | * | 4/2012 | |
| WO | WO-2009146174 A2 | * | 12/2009 | ............... G01S 5/02 |

*Primary Examiner* — Said M Elnoubi (57) ABSTRACT

A wireless communication system attests to user data from a wireless user device. The wireless user device receives satellite signals from satellites and determines satellite signal metrics for the satellite signals. The wireless user device determines its geographic location based on the satellite signals. The wireless user device executes an operating system in trusted processing circuitry in response to device power-up. The wireless user device executes a network application in the trusted processing circuitry. The network application transfers the user data, geographic location, and signal metrics to network elements. The network elements determine known satellite metrics for the geographic location. The network elements compare the satellite signal metrics to the known satellite metrics and generate an attestation score for the user data based on the satellite comparison. The network elements store the user data, the geographic location, and the attestation score. The network elements may comprise distributed ledger nodes.

20 Claims, 10 Drawing Sheets

(56) References Cited

U.S. PATENT DOCUMENTS

| | | |
|---|---|---|
| 2019/0349190 A1 | 11/2019 | Smith et al. |
| 2019/0361917 A1 | 11/2019 | Tran et al. |
| 2020/0195495 A1 | 6/2020 | Parker et al. |
| 2020/0210678 A1* | 7/2020 | Yi .................. H04W 12/71 |

* cited by examiner

DATA ATTESTATION IN A WIRELESS COMMUNICATION SYSTEM

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network. In another example, an agricultural machine may execute a liquid-dispensing application that characterizes liquid-dispensing operations with live machine-generated data.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like. Many wireless user devices also have access to wireline data networks—perhaps over short-range wireless links. These wireless user devices use the wireline data networks to communicate with the wireless network cores and receive parallel and integrated data communication services over both wireless and wireless systems.

In additional to these terrestrial wireless networks, satellites in earth orbit also exchange wireless satellite signals with some of the wireless user devices. Global Positioning System (GPS) satellites broadcast time-of-day signals with embedded satellite identifiers. The GPS signals are received and processed by the wireless user devices to determine their geographic locations. Communication satellites deliver two-way data communications by relaying user data between the wireless user devices and ground stations. The ground stations are often linked to the wireless network cores to further expand the terrestrial data communication services. Vehicles like aerial drones and autonomous trucks are configured to use parallel and integrated satellite, wireless, and wireline communications.

Unfortunately, the delivery of integrated data communication services over satellite systems, terrestrial wireless networks, and wireline data networks is poorly characterized for subsequent analysis. The cost to deploy such a monitoring system typically exceeds the requisite return-on-investment. Moreover, the wireless user devices may not be trusted to supply accurate data regarding multiple parallel communication systems.

Technical Overview

A wireless communication system attests to user data received from a wireless user device. The wireless user device receives satellite signals from satellites and determines satellite signal metrics for the satellite signals. The wireless user device determines its geographic location based on the satellite signals. The wireless user device executes an operating system in trusted processing circuitry in response to device power-up. The wireless user device executes a network application in the trusted processing circuitry. The network application transfers the user data, geographic location, and signal metrics to network elements. The network elements determine known satellite metrics for the geographic location. The network elements compare the satellite signal metrics to the known satellite metrics and generate an attestation score for the user data. The network elements store the user data, signal metrics, geographic location, and attestation score for subsequent retrieval and analysis. The network elements may comprise distributed ledger nodes.

DETAILED DESCRIPTION

Figure 1:
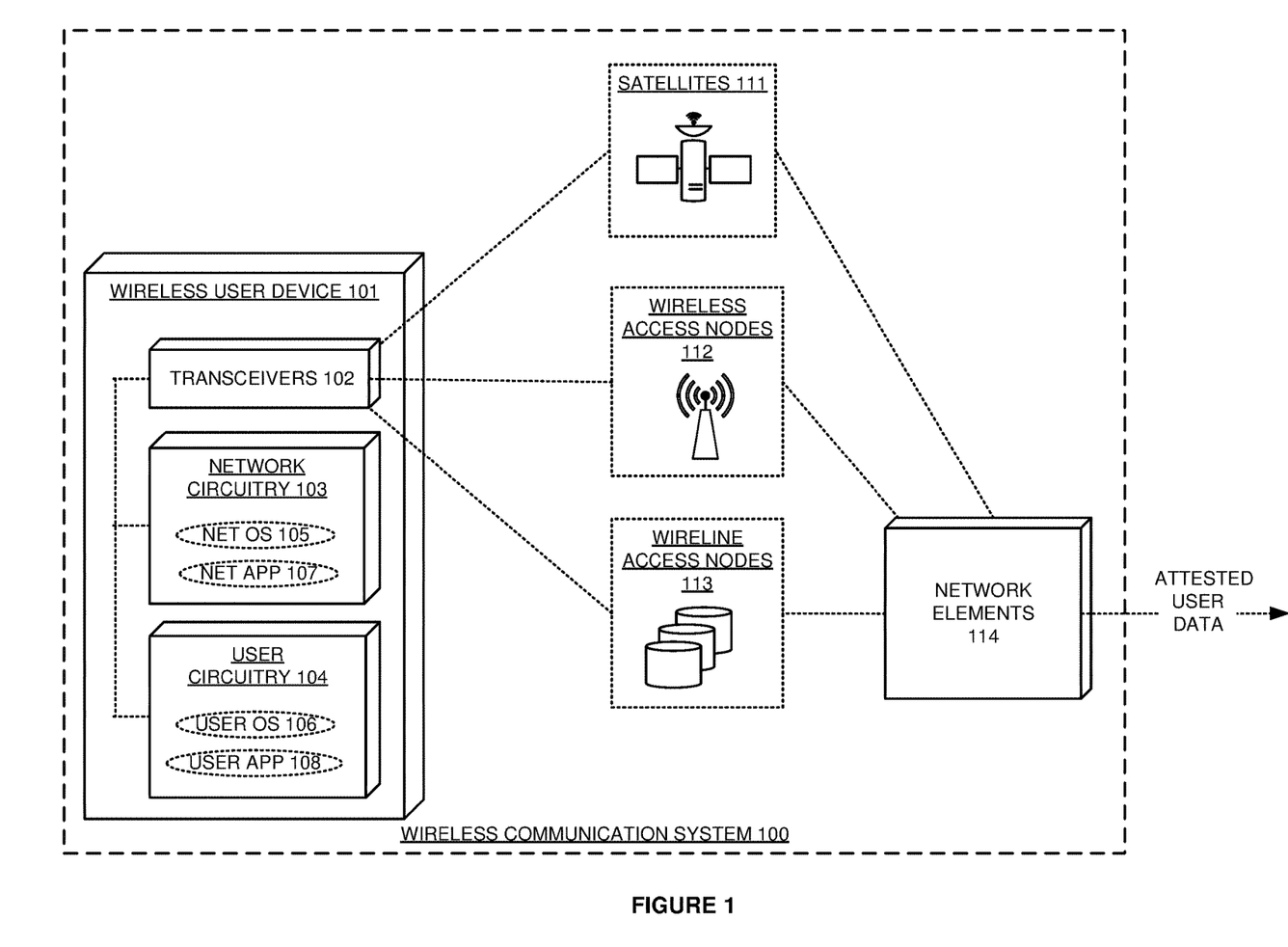
FIG. 1 illustrates an exemplary wireless communication system to a wireless communication system to attest to user data received from a wireless user device.

FIG. 1 illustrates exemplary wireless communication system 100 to attest to user data received from wireless user device 101. Wireless communication system 100 comprises wireless user device 101, satellites 111, wireless access nodes 112, wireline access nodes 113, and network elements 114. Wireless communication system 100 delivers wireless data services to wireless user device 101 like user data attestation and exposure. Wireless user device 101 comprises a computer, phone, sensor, vehicle, robot, or some other data appliance. Wireless user device 101 comprises transceivers 102, network circuitry 103, and user circuitry 104. Network circuitry 103 comprises network operating system (NET OS) 105 and network application (NET APP) 107. User circuitry 104 comprises user operating system 106 and user application 108.

Various examples of network operation and configuration are described herein. In some examples, wireless user device 101 executes network operating system 105 and network application 107 in trusted network circuitry 103 in response to device power-up. Wireless user device 101 executes user operating system 106 and user application 108 in user circuitry 104 to generate user data. Transceivers 102 wirelessly receive satellite communication signals from satellites 111. Network application 107 determines satellite signal metrics for the satellite communication signals. Network application 107 determines the geographic location of the wireless user device based on the satellite communication signals. Network application 107 compresses the user data, geographic location, and satellite signal metrics. Network application 107 transfers the user data, the geographic location, and the satellite signal metrics to network elements 114 over satellites 111, wireless access nodes 112, and/or wireline access nodes 113. Network application 107 may store and forward this information. Network elements 114 receive the user data, the geographic location, and the satellite signal metrics transferred by wireless user device 101. Network elements 114 determine known satellite metrics for the geographic location. Network elements 114 compare the satellite signal metrics to the known satellite metrics. The satellite signal metrics and the known satellite metrics comprise satellite identifiers, locations, receive powers, carrier-to-noise density ratios, and/or some other satellite signal characteristics. Ranges for the known satellite metrics may be used. Translations from metric differences into correspondence ratings could be used. Network elements 114 generate an attestation score for the user data based on the satellite metric comparison. The attestation score is high when the correspondence between the satellite signal metrics and the known satellite metrics is high. The attestation score is low when the correspondence between the satellite signal metrics and the known satellite metrics is low. The attestation score could be a binary attested or unattested score. Network elements 114 store the user data, the geographic location, the signal metrics, and the attestation score for the user data.

In some examples, transceivers 102 also receive terrestrial communication signals from wireless access nodes 112. Network application 107 determines terrestrial signal metrics for the terrestrial communication signals. Network application 107 transfers terrestrial signal metrics to network elements 114 along with the user data, the geographic location, and the satellite signal metrics. Network elements 114 determine known terrestrial metrics for the geographic location. The terrestrial signal metrics comprise node identifiers, network identifiers, Radio Frequency Channel (RF CH) identifiers, RF CH Reference Signal Received Powers (RSRPs), RF CH Reference Signal Receive Qualities (RSRQs), RF CH Signal-to-Interference Noise Ratios (SINRs), RF CH Multiple Input Multiple Output (MIMO) parameters, RF CH Carrier Aggregation (CA) parameters, and/or some other signal characteristics. Network elements 114 compare the terrestrial signal metrics to the known terrestrial metrics. Network elements 114 generate the attestation score for the user data based on the satellite metric comparison and the terrestrial metric comparison. The attestation score is high when the correspondence between the satellite/terrestrial signal metrics and the known satellite/terrestrial metrics is high. The attestation score is low when the correspondence between the satellite/terrestrial signal metrics and the known satellite/terrestrial metrics is low.

Advantageously, wireless user device 101 effectively and efficiently characterizes data communication services in a trusted manner over satellite system 111, wireless network access nodes 112, and wireline access nodes 113. Moreover, network elements 114 use these trusted characterizations to attest to the authenticity of the user data that is delivered to external data systems.

Network elements 114 may comprise a wireless network slice and/or a distributed ledger node for wireless user device 101. The distributed ledger node stores the user data, the geographic location, signal metrics, and their attestation scores in a blockchain format that comprises a genesis data block, intermediate data blocks, and eventually a terminating data block. After the genesis block, each data block includes a hash of the previous data block. The distributed ledger node may receive a request for the user data from a requesting data system, and in response, transfers the current top data block to the requesting data system.

UE 101, satellites 111, and wireless access nodes 112 comprise radios and wirelessly communicate using a wireless protocols like Fifth Generation New Radio (5GNR), Institute of Electrical and Electronic Engineers (IEEE) 802.11 (WIFI), Low-Power Wide Area Network (LP-WAN), Code Division Multiple Access (CDMA), Frequency Division Multiple Access (FDMA), and Time Division Multiple Access (TDMA). UE 101, satellites 111, access nodes 112-113, and network elements 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication system 100 as described herein.

Figure 2:
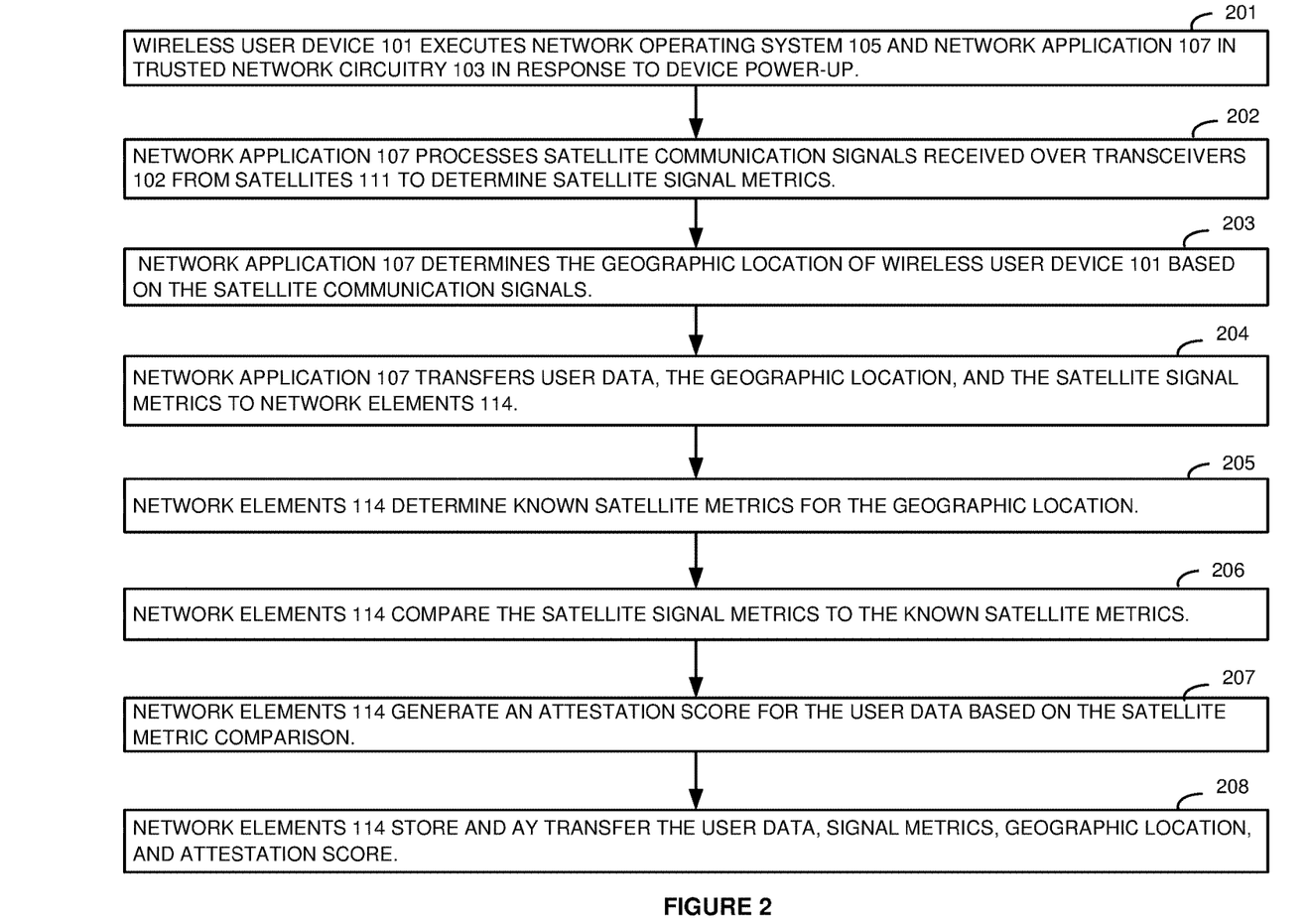
FIG. 2 illustrates an exemplary operation of the wireless communication system to attest to the user data received from the wireless user device.

FIG. 2 illustrates an exemplary operation of wireless communication system 100 to attest to the user data received from wireless user device 101. The operation may vary in other examples. Wireless user device 101 executes network operating system 105 and network application 107 in trusted network circuitry 103 in response to device power-up (201). Network application 107 processes satellite communication signals received over transceivers 102 from satellites 111 to determine satellite signal metrics (202). Network application 107 determines the geographic location of wireless user device 101 based on the satellite communication signals (203). Network application 107 transfers user data, the geographic location, and the satellite signal metrics to network elements 114 (204). Network elements 114 determine known satellite metrics for the geographic location (205). Network elements 114 compare the satellite signal metrics to the known satellite metrics (206). Network elements 114 generate an attestation score for the user data based on the satellite metric comparison (207). Network elements 114 store and transfer the user data, signal metrics, geographic location, and attestation score (208).

Figure 3:
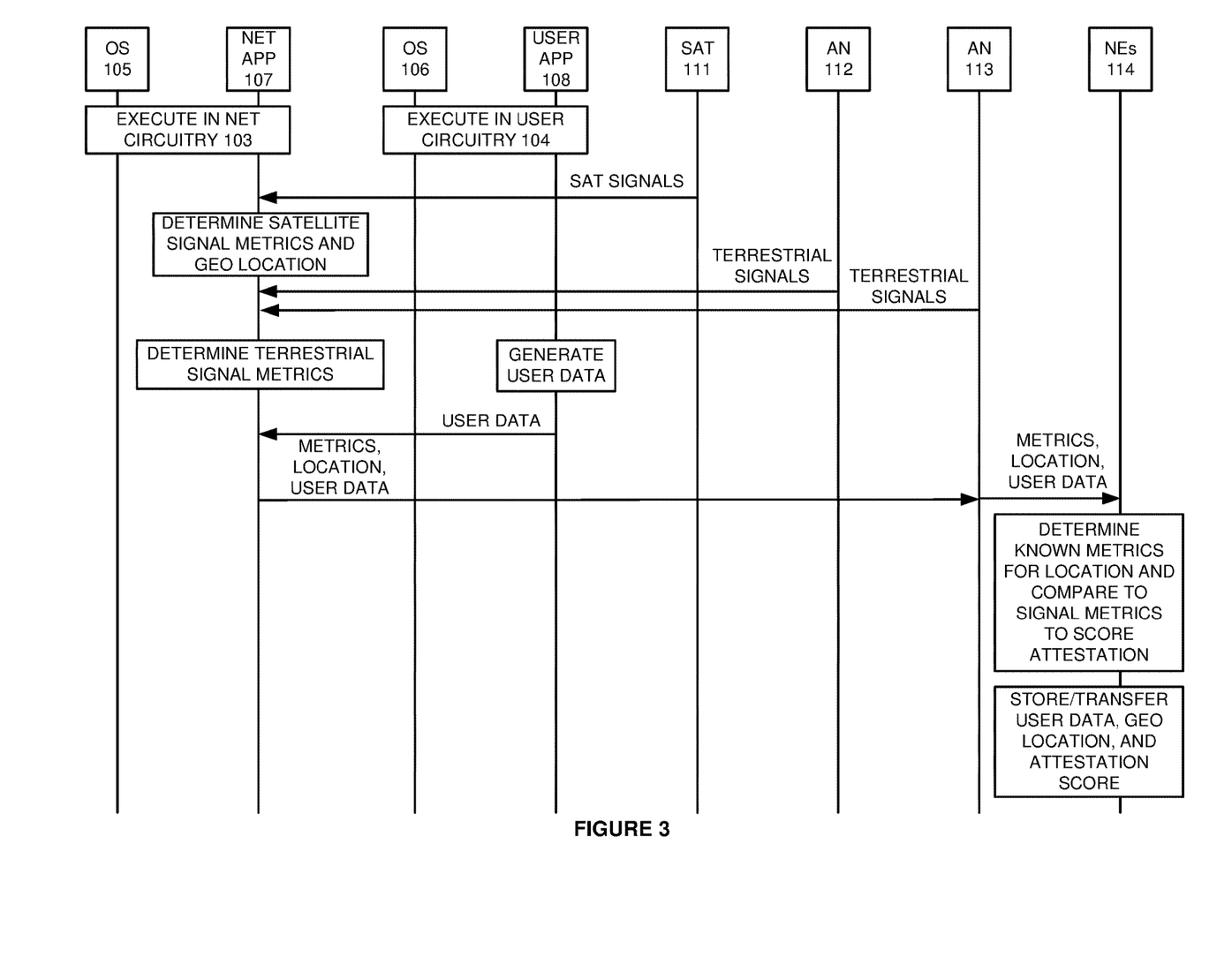
FIG. 3 illustrates an exemplary operation of the wireless communication system to attest to the user data received from the wireless user device.

FIG. 3 illustrates an exemplary operation of wireless communication system 100 to attest to the user data received from wireless user device 101. The operation may vary in other examples. Wireless user device 101 executes network operating system 105 and network application 107 in trusted network circuitry 103 in response to device power-up. Wireless user device 101 executes user operating system 106 and user application 108 in user circuitry 104. Network application 107 processes satellite communication signals received over transceivers 102 from satellites 111 to determine satellite signal metrics. Network application 107 determines the geographic location of wireless user device 101 based on the satellite communication signals. Network application 107 processes terrestrial communication signals received over transceivers 102 from wireless access nodes 112 to determine terrestrial signal metrics.

User application 108 generates user data. Network application 107 transfers the user data, the geographic location, the satellite signal metrics, and the terrestrial signal metrics to network elements 114. Network elements 114 determine known satellite metrics and known terrestrial metrics for the geographic location. Network elements 114 compare the satellite signal metrics to the known satellite metrics and compare the terrestrial signal metrics to the known terrestrial metrics. Network elements 114 generate an attestation score for the user data based on the satellite/terrestrial metric comparison. Network elements 114 store and transfer the user data, signal metrics, geographic location, and attestation score.

Figure 4:
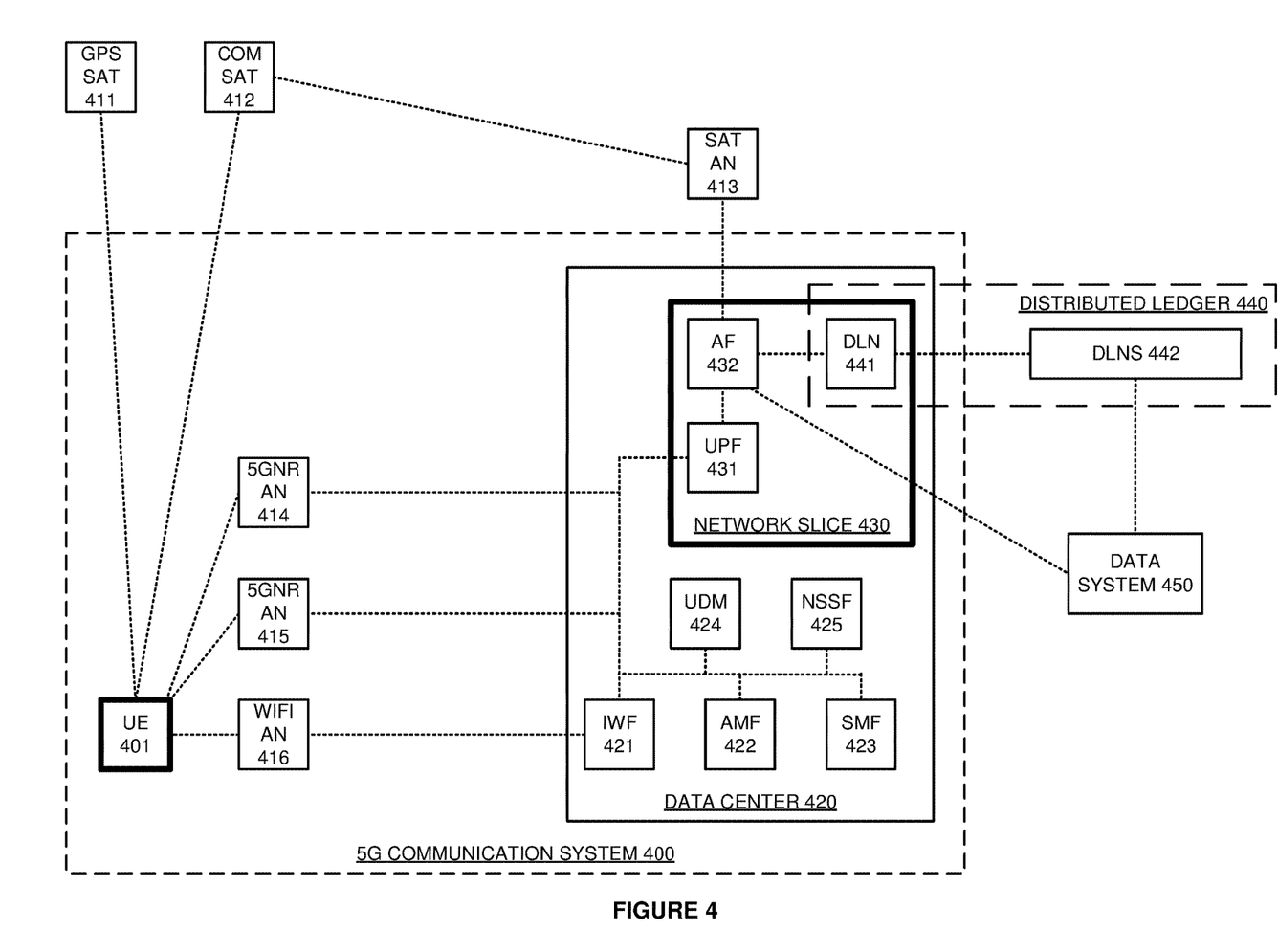
FIG. 4 illustrates an exemplary Fifth Generation (5G) communication system to attest to user data received from a wireless User Equipment (UE).

FIG. 4 illustrates exemplary Fifth Generation (5G) communication system 400 to attest to user data received from wireless User Equipment (UE) 401. 5G communication system 400 comprises an example of wireless communication system 100, although system 100 may differ. 5G communication system 400 comprises: UE 401, ANs 414-416, and network data center 420. Network data center 420 comprises Interworking Function 421, Access and Mobility Management Function (AMF) 422, Session Management Function (SMF) 423, Unified Data Management (UDM) 424, Network Slice Selection Function (NSSF) 425, and wireless network slice 430. Wireless network slice 430 comprises User Plane Function (UPF) 431, Application Function 432, and Distributed Ledger Node (DLN) 441. DLN 441 is part of distributed ledger 440 which also comprises distributed ledger nodes 442. Network data center 420 typically includes additional network functions like Network Repository Function (NRF) that are omitted for clarity.

UE 401 registers with AMF 422 over 5GNR ANs 414-415 or WIFI AN 416 and IWF 421. UE 401 reports a slice 430 capability to AMF 422. AMF 422 interacts with UDM 424 and UE 401 to authenticate UE 401 with an exchange of hash results that are based on a shared-secret key. AMF 422 interacts with UDM 424 to authorize UE 401 for reported wireless network slice 430. AMF 422 interacts with NSSF 425 to select slice identifiers for the authorized wireless network slice 430. AMF 422 interacts with SMF 423 to implement one or more data connections for wireless network slice 430. The data connections may traverse: 1) WIFI AN 416-IWF 421-UPF 431-AF 432-DLN 441, 2) 5GNR AN 415-UPF 431-AF 432-DLN 441, 3) 5GNR AN 414-UPF 431-AF 432-DLN 441, and/or 4) communication satellites 412-satellite AN 413-AF 432.

UE 401 wirelessly receives satellite communication signals from GPS satellites 411 and communication satellites 412. UE 401 determines its geographic location based on the signals from GPS satellites 411. UE 401 determines signal metrics for the signals from satellites 411-412 like identifiers, received power levels, carrier-to-noise density ratios, satellite locations, and/or some other satellite signal characteristic. UE 401 wirelessly receives 5GNR communication signals from 5GNR ANs 414-415. UE 401 determines signal metrics for the signals like network identifiers, node identifiers, Radio Frequency Channel (RF CH) identifiers, RF CH Reference Signal Received Powers (RSRPs), RF CH Reference Signal Receive Qualities (RSRQs), RF CH Signal-to-Interference Noise Ratios (SINRs), RF CH Multiple Input Multiple Output (MIMO) parameters, RF CH Carrier Aggregation (CA) parameters, and/or some other wireless signal characteristics. The signal parameters from other wireless networks like Internet-of-Things, broadcast television, WIFI, and Citizens Broadband Radio Service (CBRS) could be used for attestation in a similar manner.

UE 401 generates user data for attested exposure over wireless network slice 430. UE 401 transfers the user data, the geographic location, and the signal metrics to DLN 441 over one or more of the slice connections for wireless network slice 430. DLN 441 receives the user data, the geographic location, and the signal metrics transferred by UE 401. DLN 441 accesses a database of known signal metrics for the geographic location and time. Ranges of corresponding values may be used to determine correspondence for dynamic data like receive power levels. The difference between receives and known metrics of the same type may be translated through a data structure into a correspondence score for those specific metrics. DLN 441 compares the signal metrics from UE 401 to the known metrics. DLN 441 generate an attestation score for the user data based on the metric comparison. The attestation score is high when the correspondence between the signal metrics and the known metrics is high. The attestation score is low when the correspondence between the signal metrics and the known metrics is low. DLN 441 interacts with DLNs 442 to perform a similar attestation transaction in distributed ledger 440—perhaps using a Minimal Viable Consensus (MVC) technique.

DLNs 441-442 store the user data, the geographic location, the signal metrics and the attestation score in a blockchain format that comprises a genesis data block, intermediate data blocks, and a terminating data block. After the genesis block, the data blocks each include a hash of the previous data block. One of DLNs 441-442 receives request for attested user data from data system 450, and in response, transfers their current top data block to data system 450. Data system 450 may read the data for the recent transaction and decode the hash to obtain a transaction history. Various network functions could access DLN 441 through AF 432 like data system 450.

Figure 5:
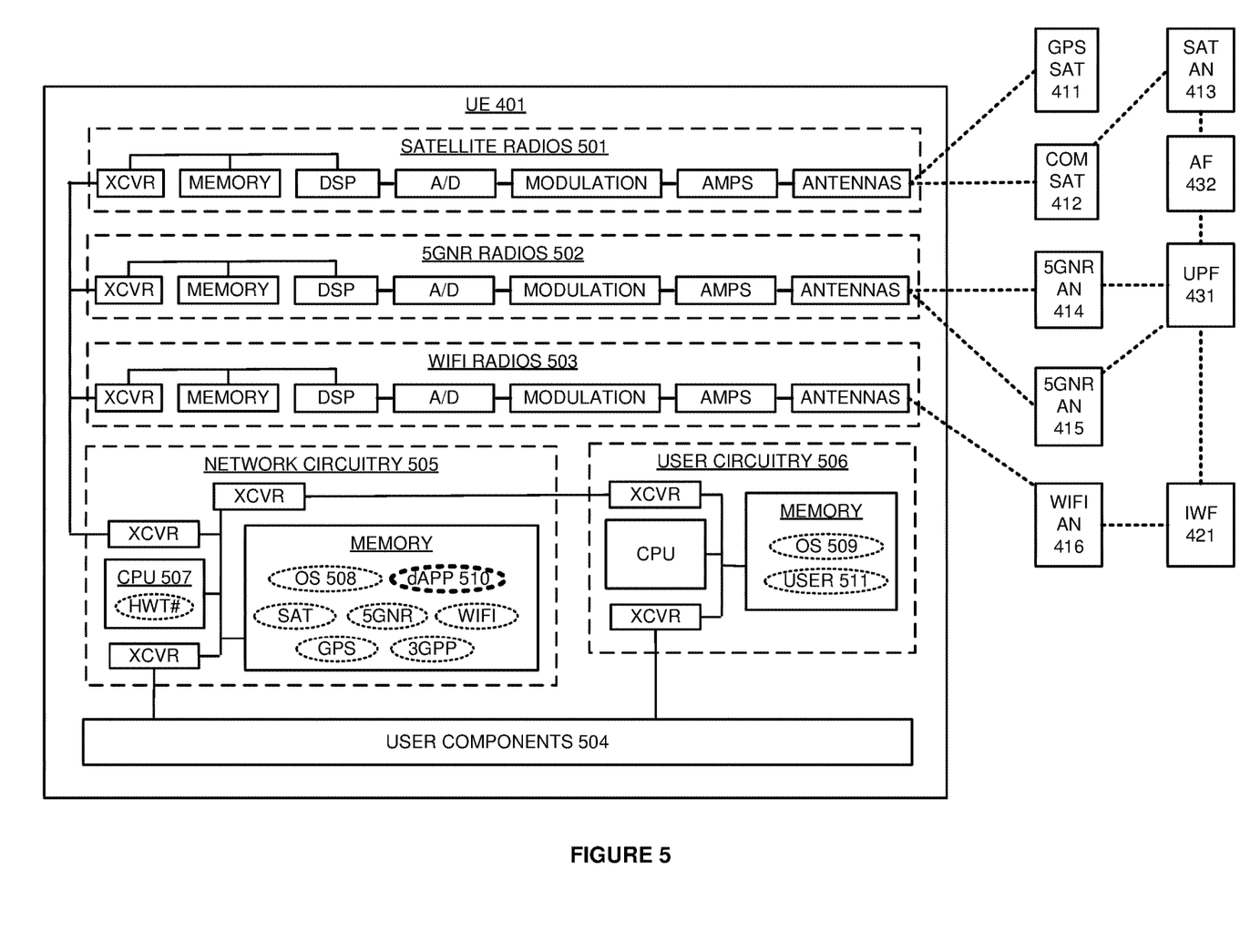
FIG. 5 illustrates an exemplary UE in the 5G communication system.

FIG. 5 illustrates exemplary wireless UE 401 in 5G communication system 400. Wireless UE 401 comprises an example of wireless user device 101, although device 101 may differ. Wireless UE 401 comprises satellite radios 501, 5GNR radios 502, WIFI radios 503, user components 504, network circuitry 505, and user network circuitry 506. Radios 501-503 comprise antennas, amplifiers, filters, modulation, analog-to-digital interfaces, DSP, memory, and transceivers that are coupled over bus circuitry. User components 504 comprise sensors, controllers, machines, or some other user apparatus that generates user data. Network circuitry 505 comprises CPU 507, memory, and transceivers (XCVRs) that are coupled over bus circuitry. CPU 507 is configured with a secret and read-only hardware-trust code (HWT #). The memory in network circuitry 505 stores operating system (OS) 508, distributed Application (dAPP) 510, satellite applications (SAT), 5GNR applications (5GNR), WIFI applications (WIFI), GPS applications (GPS), and Third Generation Partnership Project applications (3GPP). User circuitry 506 comprises CPU, memory, and transceivers that are coupled over bus circuitry. The memory in user circuitry 506 stores operating system (OS) 509 and user application (USER) 511.

In network circuitry 505, CPU 507 executes operating system 508 and dAPP 510 and the other network applications. The 3GPP applications register UE 401 with AMF 422 over one of ANs 414-416 and report a slice 430 capability. The 3GPP applications authenticate UE 401 with AMF 422 through the exchange of hash results that are based on the shared-secret key—which is a Subscriber Identity Module (SIM) code and is not the HWT #. The 3GPP applications receive UE context from AMF 422 for the slice connections for wireless network slice 430. For example, UE 401 may be given Internet Protocol (IP) addressing to use over 5GNR AN 415 or IWF 421 to reach wireless network slice 430.

The antennas in satellite radios 501 receive satellite signals from satellites 411-412 and transmit satellite signals to communication satellites 412. The antennas in 5GNR radios 502 exchange terrestrial 5GNR signals with 5GNR ANs 414-415. The antennas in WIFI radios 502 exchange terrestrial WIFI signals with WIFI AN 416. The transceivers in radios 501-503 are coupled to transceivers in network circuitry 505. The transceivers in circuitry 505-506 are coupled to one another and to user components 504. The GPS applications process the received GPS signals to determine geographic location and GPS signal metrics like received power levels and satellite location. The satellite applications process the received communication signals to determine additional satellite metrics like carrier-to-noise density ratios and received power levels. The 5GNR applications process the received 5GNR signals from ANs 414-4154 to determine the 5GNR signal metrics described herein. The WIFI applications may process the received WIFI signals from AN 416 to determine WIFI signal metrics like Service Set Identifier (SSID), channel identifier, and received power.

In user circuitry 506, the CPU executes operating system 509 and user application 511 to interact with user components 504 and generate user data. For example, user components 540 may comprise an agricultural sprayer, and user application 511 may interact with the sprayer to obtain user data that indicates live amounts of dispensed liquid. User application 511 transfers the user data to dAPP 510. In network circuitry 505, dAPP 510 receives the user data and the various signal metrics. dAPP 510 drives CPU 507 to generate Hardware Trust (HWT) data like a random number along with a hash of that random number and the HWT code that is embedded in CPU 507. dAPP 510 compresses and transfers the user data, the HWT data, the signal metrics, and the geographic location for delivery to distributed ledger 430 using one of the slice connections to UPF 431.

Figure 6:
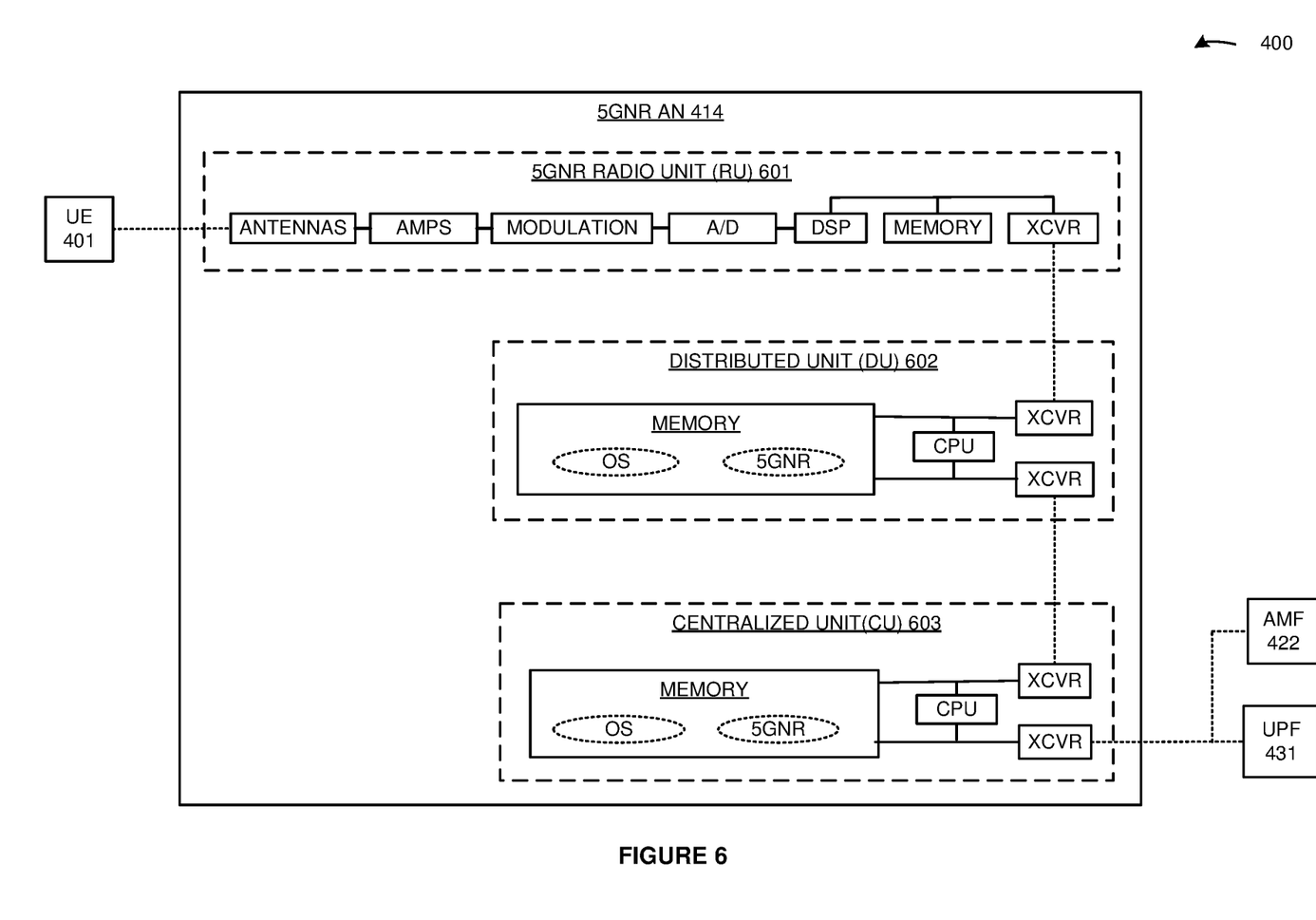
FIG. 6 illustrates an exemplary 5G New Radio Access Node (5GNR AN) in the 5G communication system.

FIG. 6 illustrates exemplary 5G New Radio Access Node (5GNR AN) 414 in 5G communication network 400. 5GNR AN 414 comprises and example of wireless access nodes 112 and 5GNR AN 415, although access nodes 112 and 415 may differ. 5GNR AN 414 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to wireless UE 401 over a 5GNR link. Transceivers in 5GNR RU 601 are coupled to transceivers in DU 602. Transceivers in DU 602 are coupled to transceivers in CU 603. Transceivers in CU 603 are coupled AMF 422 and UPF 426. The DSP and CPU in RU 601, DU 602, and CU 603 execute the radio applications, operating systems, and network applications to exchange data and signaling with UE 401, AMF 422, and UPF 431. In particular, the 5GNR applications broadcast terrestrial wireless signals over RU 601 that are received by UE 401 and used to generate terrestrial signal metrics.

Figure 7:
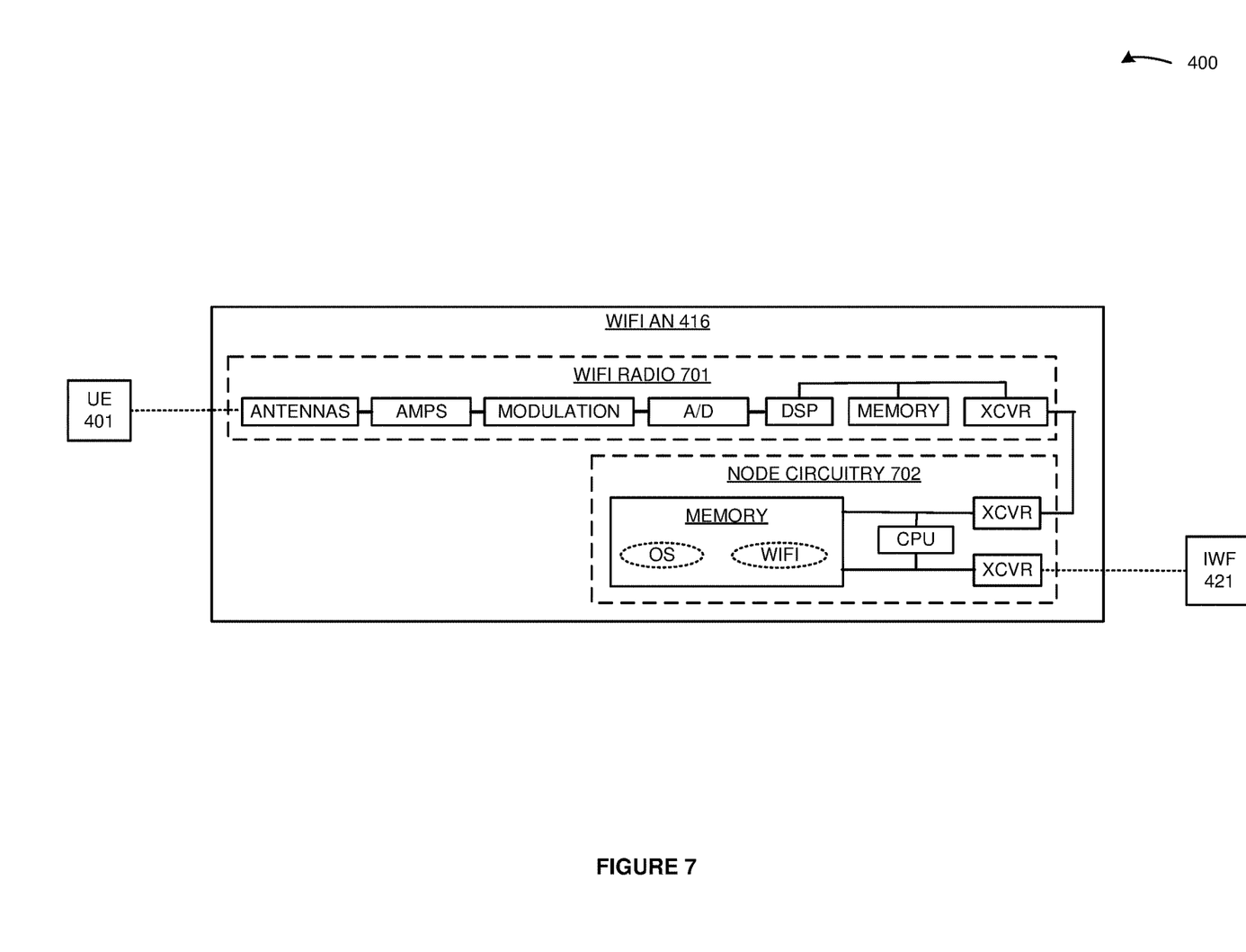
FIG. 7 illustrates an exemplary access node in the 5G communication system.

FIG. 7 illustrates exemplary IEEE 802.11 (WIFI) AN 416 in 5G communication system 400. WIFI AN 416 comprises an example of wireless access nodes 112, although nodes 112 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to wireless UE 401 over a WIFI link. Transceivers in WIFI radio 701 are coupled to transceivers in node circuitry 702. Transceivers in node circuitry 702 are coupled to transceivers in IWF 421. The CPU in node circuitry 702 executes the operating system and network applications to exchange signaling and data between wireless UE 401 and IWF 421. In some examples, the WIFI applications broadcast terrestrial wireless signals over radio 701 that are received by UE 401 and used to generate terrestrial signal metrics.

Figure 8:
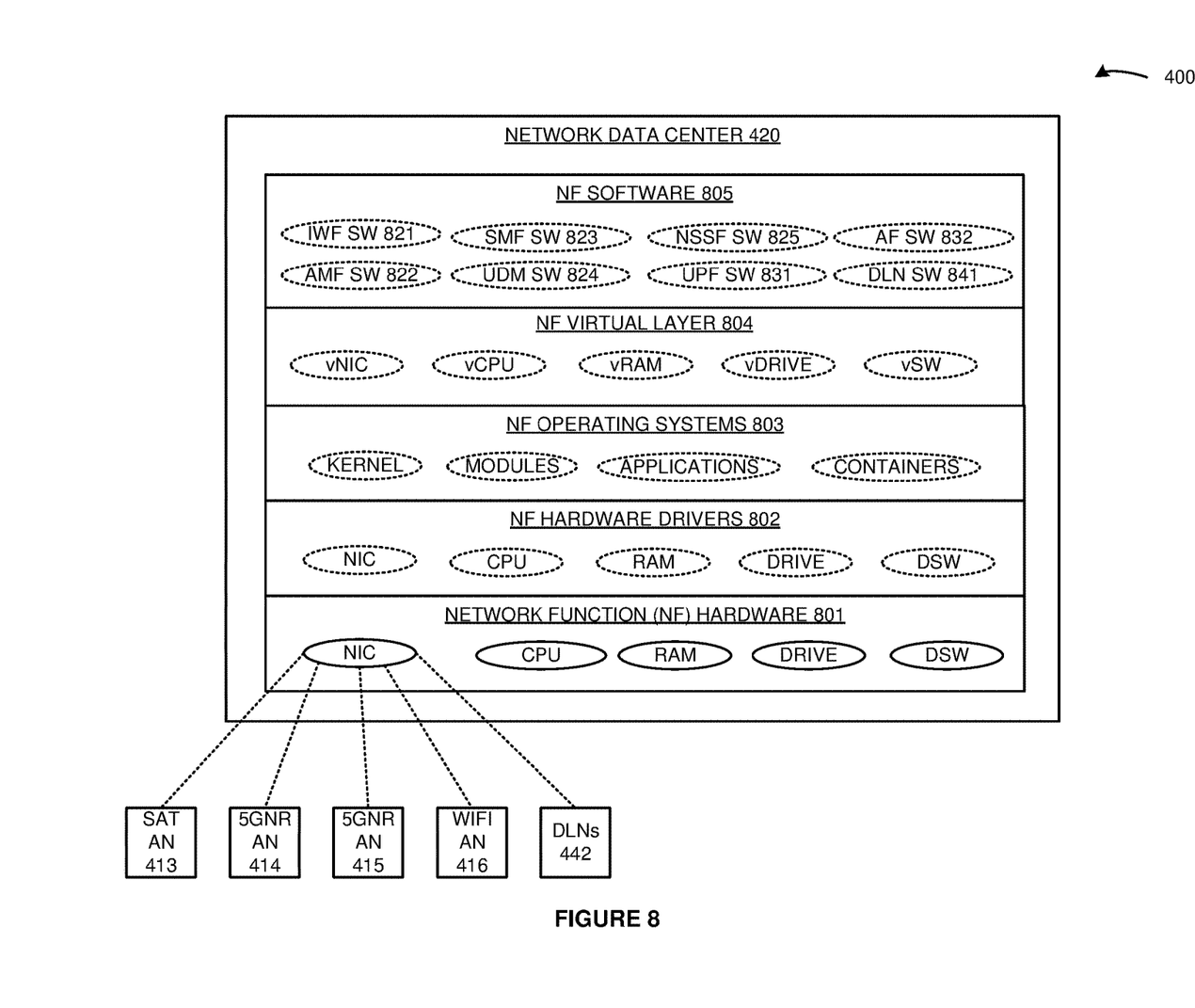
FIG. 8 illustrates an exemplary data center in the 5G communication system.

FIG. 8 illustrates exemplary data center 420 in 5G communication system 400. Network data center 420 comprises an example of network elements 114, although network elements 114 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 821, AMF SW 822, SMF SW 823, UDM SW 824, NSSF SW 825, UPF SW 831, AF SW 832, and DLN SW 841. Other NF SW like Network Repository Function (NRF) SW is typically present but is omitted for clarity. Network data center 420 may be located at a single site or be distributed across multiple geographic locations. The NIC in NF hardware 801 are coupled to SAT AN 413, 5GNR ANs 414-415, WIFI AN 416, and DLNs 442. NF hardware 801 executes NF hardware drivers 802, NF operating systems 803, NF virtual layer 804, and NF SW 805 to form and operate IWF 421, AMF 422, SMF 423, UDM 424, NSSF 425, UPF 431, AF 432, and DLN 441 as described herein.

Figure 9:
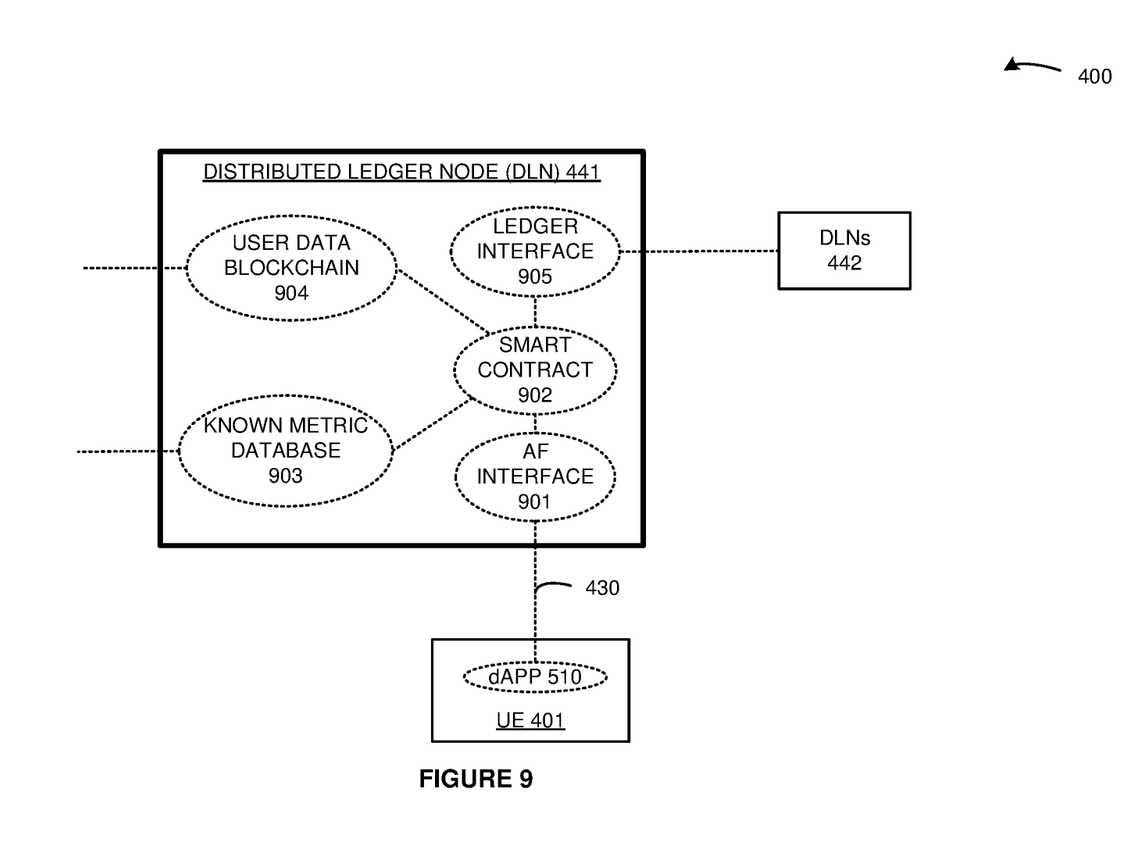
FIG. 9 illustrates an exemplary Distributed Ledger Node (DLN) in the 5G communication system.

FIG. 9 illustrates exemplary Distributed Ledger Node (DLN) 441 in 5G communication system 400. DLN 441 comprises an example of network elements 114, although network elements 114 may differ. DLN 441 comprises AF interface 901, smart contract 902, known metric database 903, user blockchain database 904, and ledger interface 905. AF interface 901 interacts with AF 432 in wireless network slice 430 over an AF Application Programming Interface (API). Known metric database 903 receives a continuous feed of known IDs, ranges, translations, and other metadata for various geographic areas like wireless network sectors or some other geographic buckets.

In UE 401, dAPP 510 transfers the user data, the HWT data, the signal metrics, and the geographic location to AF interface 901 over wireless network slice 430. AF interface module 901 validates the HWT #based on the random number—possibly by repeating the hash with the random number or by using a certificate authority that has the secret HWT # and hash algorithm used by UE 401. Once validated, AF interface module 901 transfers the user data, geographic location, and signal metrics to smart contract 902. Smart contract 902 obtains the known metrics for the geographic location from known metric database 903 and determines how closely the current signal metrics correspond to the known metrics. A close correspondence yields a high attestation score and a low correspondence yields a low attestation score. The smart contracts in DLNs 442 replicate the transaction and compare resulting attestation scores to reach a minimal consensus. When the consensus is reached, smart contract 902 stores a new data block in user data blockchain 904 that contains the user data, geographic location, attestation score, signal metrics, and hash of the previous data block. Other network functions or other data systems may read the top data block in user data blockchain 904 to obtain the user data, geographic location, signal metrics, and/or attestation score. DLNs 442 may serve access to their own data blocks in a similar manner.

Figure 10:
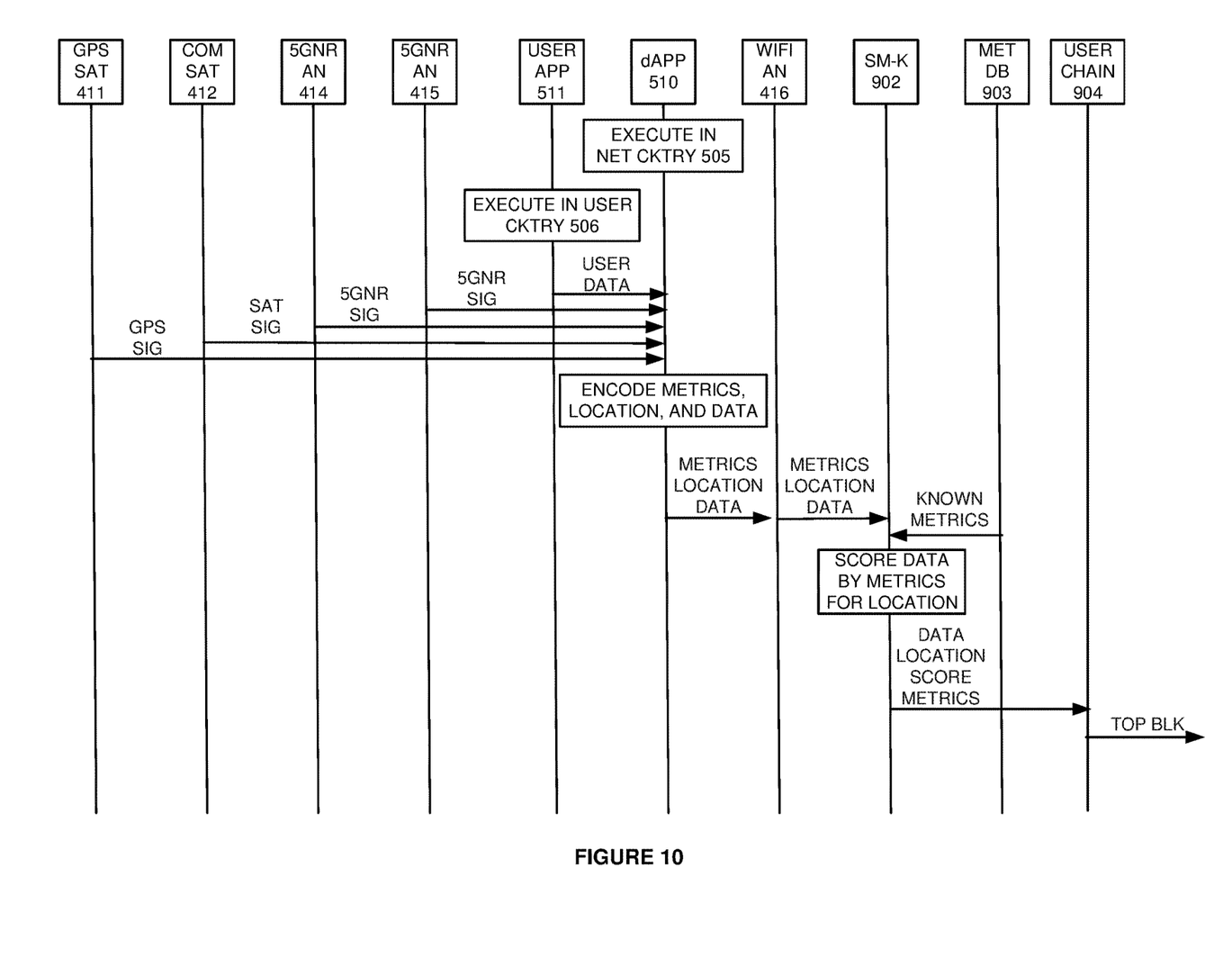
FIG. 10 illustrates an exemplary operation of the 5G communication system to attest to the user data received from the wireless UE.

FIG. 10 illustrates an exemplary operation of 5G communication system 400 to attest to the user data received from wireless UE 401. The operation may differ in other examples. In UE 401, dAPP 510 executes in network circuitry (NET CKTRY) 505 and user application 511 executes in user circuitry 506. dAPP 510 receives user data from user application 511. dAPP 510 receives digitized versions of the signals from GPS satellites 411, communication satellites 412, and 5GNR ANs 414-415. dAPP 510 determines its geographic location based on the GPS signals. dAPP 510 determines signal metrics for the received satellite and 5GNR signals. dAPP 510 transfers the user data, the geographic location, and the signal metrics to smart contract 902 in DLN 441 over wireless network slice 430. Smart contract 902 compares the signal metrics from UE 401 to the known metrics from known metric database 903. Smart contract 902 generates an attestation score for the user data based on the metric comparison. Smart contract 902 stores the user data, geographic location, signal metrics, and attestation score in user blockchain 904. User blockchain 904 serves top data blocks to requesting data systems and network functions 450.

The wireless data network circuitry described above comprises computer hardware and software that form special-purpose wireless communication circuitry to attest to the user data received from wireless user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication circuitry to attest to the user data received from wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to attest to user data received from a wireless user device, the method comprising:
    the wireless user device executing an operating system in trusted processing circuitry in response to device power-up;
    the wireless user device generating the user data;
    the wireless user device wirelessly receiving satellite communication signals from satellites, determining satellite signal metrics for the satellite communication signals, and determining a geographic location of the wireless user device based on the satellite communication signals;
    the wireless user device executing a network application in the trusted processing circuitry and the network application transferring the user data, the geographic location, and the satellite signal metrics; and
    one or more network elements receiving the user data, the geographic location, and the satellite signal metrics transferred by the wireless user device, determining known satellite metrics for the geographic location, comparing the satellite signal metrics to the known satellite metrics, generating an attestation score for the user data based on the satellite metric comparison, and storing the user data, the geographic location, and the attestation score for the user data, wherein comparing the satellite signal metrics to the known satellite metrics to generate the attestation score comprises comparing at least one of communication satellite received power levels and communication satellite carrier-to-noise density ratios levels to generate the attestation score.

2. The method of claim 1 wherein the satellite signal metrics comprise satellite identifiers, satellite locations, the communication satellite received power levels, and the communication satellite carrier-to-noise density ratios levels.

3. The method of claim 1 wherein the one or more network elements comparing the satellite signal metrics to the known satellite metrics to generate the attestation score comprises comparing the communication satellite received power levels, or the communication satellite carrier-to-noise density ratios levels to generate the attestation score.

4. The method of claim 1 further comprising:
the wireless user device wirelessly receiving terrestrial communication signals from terrestrial communication nodes and determining terrestrial signal metrics for the terrestrial communication signals;
in the trusted processing circuitry in the wireless user device, the executing network application transferring the terrestrial signal metrics along with user data, the geographic location, and the satellite signal metrics;
the one or more network elements receiving the terrestrial signal metrics along with the user data, the geographic location, and the satellite signal metrics transferred by the wireless user device, determining known terrestrial metrics for the geographic location, and comparing the terrestrial signal metrics to the known terrestrial metrics; and wherein
the one or more network elements generating the attestation score for the user data based on the satellite metric comparison comprises generating the attestation score for the user data based on the satellite metric comparison and the terrestrial metric comparison.

5. The method of claim 4 wherein the one or more network elements comparing the terrestrial signal metrics to the known terrestrial metrics to generate the attestation score comprises comparing at least one of Radio Frequency Channel (RF CH) Signal-to-Interference Noise Ratios (SINRs), RF CH Reference Signal Received Powers (RSRPs), and RF CH Reference Signal Receive Qualities (RSRQs) to generate the attestation score.

6. The method of claim 4 wherein the one or more network elements comparing the terrestrial signal metrics to the known terrestrial metrics to generate the attestation score comprises comparing at least one of Radio Frequency Channel (RF CH) Multiple Input Multiple Output (MIMO) parameters and RF CH Carrier Aggregation (CA) parameters to generate the attestation score.

7. The method of claim 1 wherein the one or more network elements determining the known satellite metrics for the geographic location, comparing the satellite signal metrics to the known satellite metrics, generating the attestation score based on the satellite metric comparison, and storing the user data, the geographic location, and the attestation score comprises a wireless network slice determining the known satellite metrics for the geographic location, comparing the satellite signal metrics to the known satellite metrics, generating the attestation score based on the satellite metric comparison, and storing the user data, the geographic location, and the attestation score.

8. The method of claim 1 wherein the one or more network elements determining the known satellite metrics for the geographic location, comparing the satellite signal metrics to the known satellite metrics, generating the attestation score based on the satellite metric comparison, and storing the user data, the geographic location, and the attestation score comprises a distributed ledger node determining the known satellite metrics for the geographic location, comparing the satellite signal metrics to the known satellite metrics, generating the attestation score based on the satellite metric comparison, and storing the user data, the geographic location, and the attestation score.

9. The method of claim 1 wherein:
the one or more network elements storing the user data and the attestation score comprises storing the user data and the attestation score in a blockchain format that comprises a genesis data block, intermediate data blocks, and a terminating data block; and further comprising
the one or more network elements receiving a request for the user data from a requesting data system, and in response, transferring the terminating data block for delivery to the requesting data system.

10. The method of claim 1 wherein:
the one or more network elements storing the user data and the attestation score comprises storing the user data, the satellite signal metrics, and the attestation score in a blockchain format that comprises a genesis data block, intermediate data blocks, and a terminating data block; and further comprising
the one or more network elements receiving a request for the user data from a requesting data system, and in response, transferring the terminating data block for delivery to the requesting data system.

11. A wireless communication system to attest to user data received from a wireless user device, the wireless communication system comprising:
the wireless user device configured to execute an operating system in trusted processing circuitry in response to device power-up, generate the user data, wirelessly receive satellite communication signals from satellites, determine satellite signal metrics for the satellite communication signals, determine a geographic location of the wireless user device based on the satellite communication signals, execute a network application in the trusted processing circuitry;
the executing network application configured to transfer the user data, the geographic location, and the satellite signal metrics; and
one or more network elements configured to receive the user data, the geographic location, and the satellite signal metrics transferred by the wireless user device, determine known satellite metrics for the geographic location, compare the satellite signal metrics to the known satellite metrics, generate an attestation score for the user data based on the satellite metric comparison, and store the user data, the geographic location, and the attestation score for the user data, wherein the one or more network elements are configured to compare at least one of communication satellite received power levels and communication satellite carrier-to-noise density ratios levels to generate the attestation score.

12. The wireless communication system of claim 11 wherein the one or more network elements are configured to compare the communication satellite received power levels or the communication satellite carrier-to-noise density ratios levels to compare the satellite signal metrics to the known satellite metrics to generate the attestation score.

13. The wireless communication system of claim 11 further comprising:
the wireless user device configured to wirelessly receive terrestrial communication signals from terrestrial communication nodes and determine terrestrial signal metrics for the terrestrial communication signals;
the executing network application configured to transfer the terrestrial signal metrics along with user data, the geographic location, and the satellite signal metrics;
the one or more network elements configured to receive the terrestrial signal metrics along with the user data, the geographic location, and the satellite signal metrics transferred by the wireless user device, determine known terrestrial metrics for the geographic location, and compare the terrestrial signal metrics to the known terrestrial metrics; and wherein the one or more network elements are configured to generate the attestation score for the user data based on the satellite metric comparison and the terrestrial metric comparison to generate the attestation score for the user data based on the satellite metric comparison.

14. The wireless communication system of claim 13 wherein the terrestrial signal metrics and the known terrestrial metrics comprise at least one of Radio Frequency Channel (RF CH) Signal-to-Interference Noise Ratios (SINRs), RF CH Reference Signal Received Powers (RSRPs), and RF CH Reference Signal Receive Qualities (RSRQs) to generate the attestation score.

15. The wireless communication system of claim 13 wherein the terrestrial signal metrics and the known terrestrial metrics comprise at least one of Radio Frequency Channel (RF CH) Multiple Input Multiple Output (MIMO) parameters and RF CH Carrier Aggregation (CA) parameters to generate the attestation score.

16. The wireless communication system of claim 11 wherein the one or more network elements comprise a wireless network slice.

17. The wireless communication system of claim 11 wherein the one or more network elements comprise a distributed ledger node.

18. The wireless communication system of claim 11 wherein:

the one or more network elements are configured to store the user data and the attestation score in a blockchain format that comprises a genesis data block, intermediate data blocks, and a terminating data block to store the user data and the attestation score; and further comprising the one or more network elements configured to receive a request for the user data from a requesting data system, and in response, transfer the terminating data block for delivery to the requesting data system.

19. The wireless communication system of claim 11 wherein:

the one or more network elements are configured to store the user data, the satellite signal metrics, and the attestation score in a blockchain format that comprises a genesis data block, intermediate data blocks, and a terminating data block to store the user data and the attestation score; and further comprising the one or more network elements configured to receive a request for the user data from a requesting data system, and in response, transfer the terminating data block for delivery to the requesting data system.

20. One or more non-transitory computer-readable storage media having program instructions stored thereon, wherein the program instructions, when executed by a computing system, direct the computing system to perform operations, the operations comprising:

executing an operating system in trusted processing circuitry of a wireless user device in response to device power-up;

generating user data;

controlling radio circuitry to wirelessly receive satellite communication signals from satellites;

determining satellite signal metrics for the satellite communication signals;

determining a geographic location of the wireless user device based on the satellite communication signals; and executing a network application in the trusted processing circuitry to transfer the user data, the geographic location, and the satellite signal metrics to one or more network elements wherein the one or more network elements receive the user data, the geographic location, and the satellite signal metrics, determine known satellite metrics for the geographic location, compare the satellite signal metrics to the known satellite metrics by comparing at least one of communication satellite received power levels and communication satellite carrier-to-noise density ratios levels, generate an attestation score for the user data based on the satellite metric comparison, and storing the user data, the geographic location, and the attestation score for the user data.

* * * * *